March 15, 1960 A. ALLISY 2,928,946
METHOD OF AND DEVICE FOR CORRECTING THE X-RAY SPECTRAL
SENSITIVITY OF PHOTOGRAPHIC EMULSIONS, AND
PRODUCTS OBTAINED THEREFROM
Filed Nov. 4, 1955 4 Sheets-Sheet 1
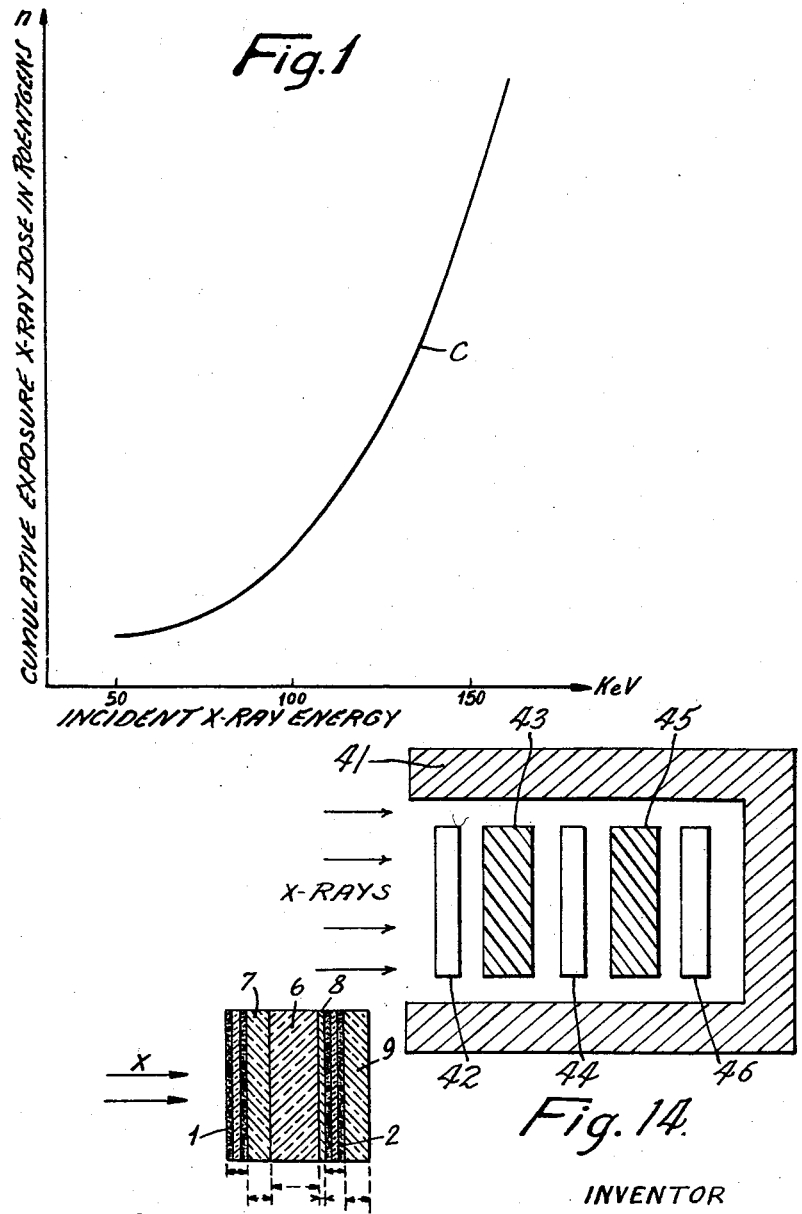
INVENTOR
ANDRÉ ALLISY
By Linton and Linton
ATTORNEYS March 15, 1960  A. ALLISY  2,928,946
METHOD OF AND DEVICE FOR CORRECTING THE X-RAY SPECTRAL
SENSITIVITY OF PHOTOGRAPHIC EMULSIONS, AND
PRODUCTS OBTAINED THEREFROM
Filed Nov. 4, 1955  4 Sheets-Sheet 2
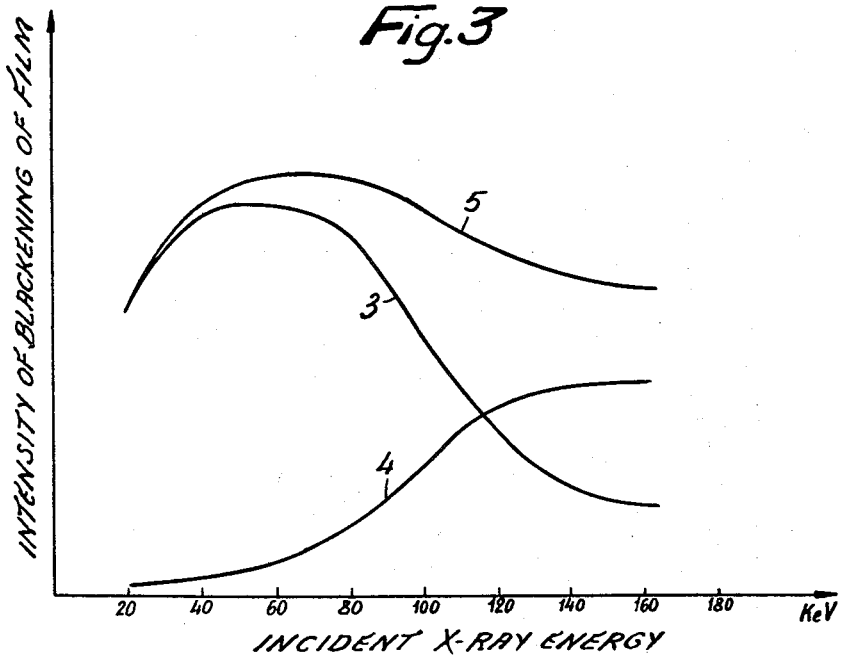
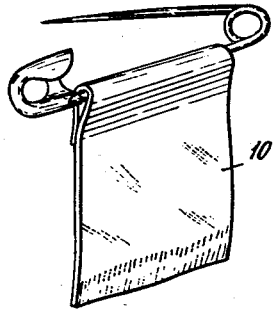
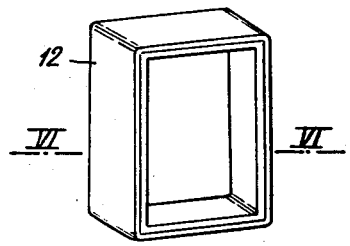
INVENTOR
ANDRÉ ALLISY
BY Linton and Linton
ATTORNEYS March 15, 1960　　　　　　A. ALLISY　　　　　　2,928,946
METHOD OF AND DEVICE FOR CORRECTING THE X-RAY SPECTRAL
SENSITIVITY OF PHOTOGRAPHIC EMULSIONS, AND
PRODUCTS OBTAINED THEREFROM
Filed Nov. 4, 1955　　　　　　　　　　　　　　4 Sheets-Sheet 3
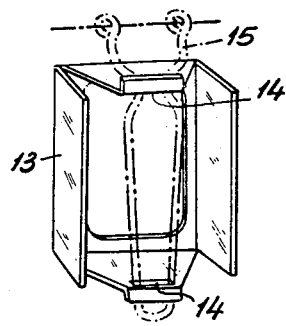
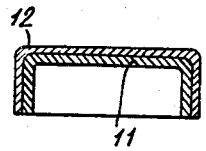
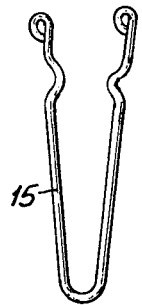
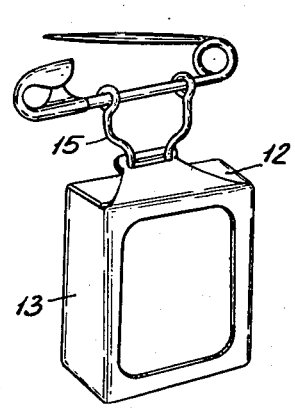
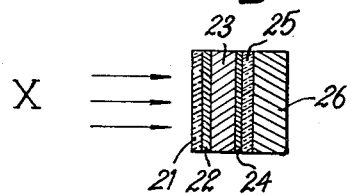
INVENTOR
ANDRÉ ALLISY
By Linton and Linton
ATTORNEYS United States Patent Office 2,928,946
Patented Mar. 15, 1960

2,928,946

METHOD OF AND DEVICE FOR CORRECTING THE X-RAY SPECTRAL SENSITIVITY OF PHOTOGRAPHIC EMULSIONS, AND PRODUCTS OBTAINED THEREFROM

André Allisy, Paris, France, assignor to Societe dite: G. Massiot & Cie, Courbevoie, France Application November 4, 1955, Serial No. 545,030

Claims priority, application France November 8, 1954

3 Claims. (Cl. 250—65)

This invention relates to improvements in photographic films and is concerned more particularly with the correction of the spectral sensitivity of photographic films in X-ray frequency values on devices which are adapted for personal wear as a badge by persons exposed to such radiation.

It is well known that the variation of the spectral sensitivity of different photographic films in the field of X-rays as now employed (i.e. from 20 to 200 kev. for example) is extremely important.

It is an object of the present invention to provide a method of and means for so correcting these variations so that the blackening of the film or films employed will constitute a measurement in Roentgen units of the integrated quantity of the X radiation incident on the emulsions.

According to the present invention this correction is effected by using any two or more photographic emulsions having different spectral sensitivities; furthermore, these emulsions may be juxtaposed or superposed.

In addition, the following complementary means may be used for carrying out this present invention:

(1) The action exerted by the X-ray beam to be measured on the emulsions takes place after different and suitable filtrations in which it is possible to use the general pattern of the absorption coefficient as well as the absorption differences, or edges, defined by Hine in "Radiation Dosimetry," New York 1956;

(2) The whole or part of the front and back emulsions are in direct contact with a predetermined material. The coefficient of absorption of this material must be such that the corpuscular or electromagnetic radiation of electrons produced thereon by the primary X-rays will exert on the corresponding photographic emulsion a preponderant action in the spectral range in which this emulsion has a low sensitivity. When corpuscular radiation of photoelectrons is used the minimum thickness of these layers is equal to the maximum path of the most powerful photoelectron produced therein;

(3) The different emulsions may also contact, either directly or through the medium of a thin protective layer, bodies or metal filter sheets of which the diffused radiation may be utilised for producing a complementary film-blackening action. In this case, the resulting radiation of photons within the material is either a diffused radiation of forward or backward direction of photons, or a fluorescent or luminescent or phosphorescent radiation of these bodies such as the metal filter sheets. It is also possible to reinforce the effect thus produced by inserting an emulsion between two blocks of diffusing materials such as lead sheets serving if desired as filters for subsequent emulsions.

The principle of this present invention and the manner in which the same may be carried out in practice will appear more clearly as the following description proceeds with reference to the attached drawings, in which:

Figure 1 is a diagram for a film having a representative type of emulsion indicating the relation between the X-ray energy and the cumulative dose of incident X-rays, expressed in Roentgen units, required for producing a constant intensity of blackening of a particular photographic emulsion to illustrate the principle;

Figure 2 is a diagrammatical section of a first modification of a composite assembly adapted to be utilised in accordance with the teachings of this present invention;

Figure 3 shows the curves produced when using a composite assembly of the type illustrated in Figure 2;

Figure 4 is a perspective view of a mounting for a device manufactured in accordance with the teachings of the present invention;

Figures 5 and 6 are a perspective view and a cross-sectional view, respectively, of a protective box, the section being taken upon the line VI—VI of Figure 5;

Figures 7, 8 and 9 are perspective views showing a box casing, a suspension clasp, and the complete assembly to be carried by the user, respectively;

Figure 11:
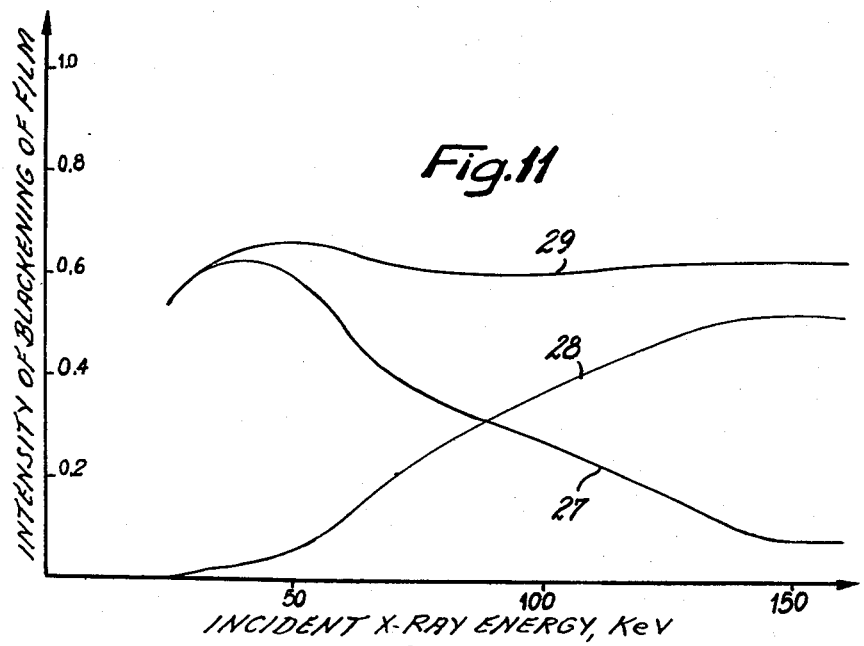
Figure 12:
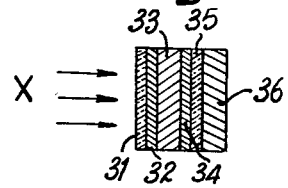
Figure 13:
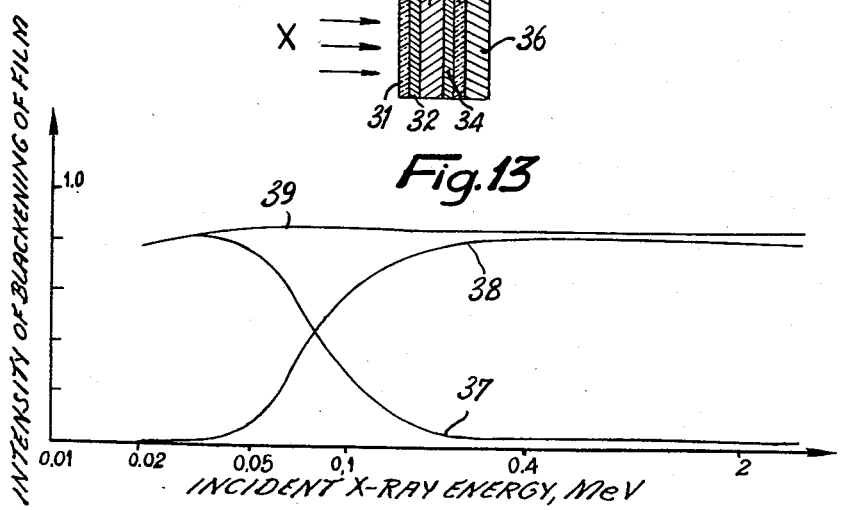

Figures 10 and 11 are diagrammatical views showing a modified embodiment of this present invention and the corresponding curves therefor, and Figures 12 and 13 are views similar to Figures 10 and 11 showing another modified embodiment of the present invention.

Referring first to Figure 1, illustrating the principle involved it will be seen that the dose in Roentgens of X-rays plotted in ordinates to produce a predetermined constant blackening of a given emulsion increases rapidly, in the case of this specific emulsion, with the energy of the incident rays shown in abscissae as electron volts. The single curve shown corresponds to one particular intensity of blackening of this film.

Figure 2 illustrates in cross-section a device adapted to measure in Roentgen units a dose of X-rays received in the direction of the arrows in the spectral range from 20 to 160 kev. with an accuracy of 20%.

The curves shown in Figure 3 illustrate for the device of Fig. 2 the variations in the blackening of the films as a function of the radiation energy in electron volts for a constant incident Roentgen dose.

In Fig. 2 two photographic films are shown at 1 and 2 of which the sensitivity curves are shown at 3 and 4 respectively in the diagram of Figure 3, the curve 5 indicating the sum of these curves 2 and 4.

In Figure 2, the reference numeral 6 designates a copper sheet, 7, 8 and 9 are three tantalum sheets, sheet 7 being placed between the film 1 and the aforesaid copper sheet 6, while the other sheets 8 and 9 are positioned on either side of the film 2 behind the copper sheet 6. The sheets represented are given by way of example only, for the thicknesses of the bodies as well as their kinds of material are determined experimentally as a function of the characteristics of the emulsions employed in the films 1 and 2. The sheets 7, 6 and 8 act as filter means for the film 2 and also for the film 1 due to their back-diffused radiation. Tantalum sheets 8 and 9 act also on the film 2 through their diffused radiation and sheet 8 acts further through its corpuscular radiation on the film 2.

The curve 5 of Fig. 3 permits a reading for the assembly of Fig. 2 of the applied dose in Roentgen units plotted against the energy of the incident radiation between 20 and 160 kev. with a maximum error of 20%. In Fig. 3 the abscissae are incident X-ray energy (in kev.) and the ordinates are intensity of blackening of the film, all curves for the same cumulative exposure dose in Roentgens.

It would be an easy matter to add a third film having such filter properties that this last film would measure only the radiations having energy values higher than 160 kev. Such an arrangement is shown in Fig. 14, in which 41 is a frame or cassette, 42 is a first film corresponding to film 1 of Fig. 2, 43 is a first filter corresponding to filter 7 of Fig. 2, 44 is a second film corresponding to film 2 of Fig. 2, 45 is a second filter corresponding to filter 8 of Fig. 2, and having such filter properties that it will transmit only the photon energy higher than 160 kev. and 46 is a third film of such a greater sensitivity that it will record only the radiation of an energy greater than 160 kev.

Finally, instead of taking the sum of curves 3 and 4, it is possible to take the difference (or any other combination) between the curves 3 and 4 respectively for films 1 and 2 to obtain an indication of the mean spectral quality of the radiation recorded by the device.

The photographic films as well as the various correcting materials may be packed in a light-impermeable packet carried by the user in a plastic packing 10 sealed hermetically as shown by way of example in Figure 4, or in a small protective box of which the assembly and constructional details are illustrated in Figures 5 to 9.

The box 12 of Figs. 5, 6, and 9, comprises a lead bottom wall 11 adapted to eliminate any backward radiation from the body of the person carrying the device; a similar lead sheet (not shown) may be used in the sealed packing of Figure 4.

In the film packet of Figures 5 to 9, the box 12 is adapted to be inserted in a support 13 consisting of a frame having bent lugs constituting a kind of casing. A pair of opposite slots 14 are provided in opposite lugs of the frame and adapted to receive a clasp 15 for retaining the box 12 inside the carrier 13 so as to lock it in position and also serve as a means for suspending it from another support.

In Figure 10 there is shown a second modified practical embodiment of this present invention. The reference numeral 21 designates a wrapped M-type film, 22 is a lead sheet 2 mm. thick, 23 is a copper sheet 2.07 mm. thick, 24 is a tantalum sheet 0.1 mm. thick, 25 is a "Definix" plain or bare film, and 26 is the lead wall of the protective box. In order to protect the film 25, a paper sheet may be arranged between said film 25 and the lead wall 26.

Figure 11 is the corresponding diagram of sensitivity curves similar to Fig. 3 showing at 27 the curve giving for a constant dose in Roentgens as ordinates the blackening density (after deducting the veil) in relation to the energy of the X-rays received by the film 21 as abscissae, and at 28 a similar curve for the film 25; on the other hand, the curve 29 indicates the sum of the two curves (27 plus 28) and it is clearly apparent that this summation curve is very close to a horizontal straight line.

Figure 12 illustrates a third modified embodiment in which 31 is a wrapped M-type film, 32 a lead sheet 0.2 mm. thick, 33 a tin sheet 0.7 mm. thick, 34 a lead sheet 0.2 mm. thick, 35 a wrapped "Kodirex" film and 36 the lead wall of the protective box.

The spectral sensitivity curves of blackening density as ordinates shown in Figure 13 correspond to the embodiment of Fig. 12 and comprise a curve 37 corresponding to the M-type film 31, a curve 38 corresponding to the "Kodirex" film and a curve 39 representing the sum of the two curves 37 and 38. The abscissae indicate the megaelectronvolt value of the incident X-ray energy.

It will be observed that summation curve 39 approximates still more closely to a straight line.

In Fig. 11, the abscissae are incident X-ray energy (in kev.) and the ordinates are intensity of blackening of film, all for the same given cumulative exposure dose in Roentgens. In Fig. 13, the abscissae are incident X-ray energy (in mev.); and the ordinates are intensity of blackening of film, all for the same given cumulative exposure dose in Roentgens.

It will be apparent to those skilled in the art that the present invention is susceptible of modifications to adapt the same to particular applications, and all such modifications which are comprised within the scope of the appended claims are considered to be comprehended with in the spirit of my invention.

What I claim is:

1. In a radiation meter adapted for personal wear, two photographic films sensitive to X-rays, a plurality of metal laminae of differing X-ray filtering characteristics interposed between said films, and means for holding said films and laminae in stacked relation, said films having different characteristic curves of blackening intensity against incident X-ray energy in electron volts for a given Roentgen exposure dose said films and the kind and thickness of said laminae being so selected that the sum of the characteristic curves of the records on said two films in the assembly of blackening intensity against incident X-ray energy in electron volts is substantially constant for a given Roentgen dose.

2. In a radiation meter for personal wear, a plurality of photographic films of differing X-ray sensitivities, a plurality of metal laminae formed of metals of different X-ray filtering characteristics interposed between said films, and means for holding said films and said laminae in stacked relation, said films having different characteristic curves of blackening intensity against incident X-ray energy in electron volts for a given Roentgen dose, said films and the kind and thickness of said laminae being so selected that the sum of the characteristic curves of the records on the plurality of films in the assembly, of blackening intensity against X-ray energy in electron-volts, is substantially constant for a given Roentgen dose.

3. In a radiation meter for personal wear, a plurality of photographic films of differing X-ray sensitivities, a plurality of metal laminae formed of metals of different X-ray filtering and intensifying characteristics interposed between said films, and means for holding said films and said laminae in stacked relation, said films having different characteristic curves of blackening intensity against incident X-ray energy in electron volts for a given Roentgen dose, said films and the kind and thickness of said laminae being so selected that the sum of the characteristic curves of the records on the plurality of films in the assembly, of blackening intensity against X-ray energy in electron volts is substantially constant for a given Roentgen dose.

References Cited in the file of this patent

UNITED STATES PATENTS

| 2,496,218 | Kieffer | Jan. 31, 1950 |
| 2,541,599 | Morrison | Feb. 13, 1951 |
| 2,659,013 | Davis | Nov. 10, 1953 |